United States Patent [19]

Samis

[11] Patent Number: 4,687,390

[45] Date of Patent: * Aug. 18, 1987

[54] ENGRAVING APPARATUS HAVING IMPROVED BEARING AND PATTERN

[76] Inventor: Philip L. Samis, 1 Place Ville Marie, Suite 1521, Montreal, H3B 2B5, Canada

[*] Notice: The portion of the term of this patent subsequent to Sep. 27, 2000 has been disclaimed.

[21] Appl. No.: 507,161

[22] Filed: Jun. 23, 1983

Related U.S. Application Data

[63] Continuation-in-part of Ser. No. 384,108, Jun. 1, 1982, Pat. No. 4,591,304, and a continuation-in-part of Ser. No. 189,022, Sep. 22, 1980, Pat. No. 4,406,567.

[51] Int. Cl.⁴ ...................... B23Q 35/10; B43L 13/10
[52] U.S. Cl. ...................................... 409/92; 33/24.2; 409/90; 409/91; 409/84
[58] Field of Search ................... 33/24 R, 24 B, 24 C, 33/23 K; 409/84, 89, 90, 91, 92, 130, 134, 86

[56] References Cited

U.S. PATENT DOCUMENTS

| 190,797 | 5/1877 | Ware | 33/24 B |
|---|---|---|---|
| 517,680 | 4/1894 | Chase | 409/92 |
| 742,180 | 10/1903 | Francis | 33/23 K |
| 1,036,526 | 8/1912 | Cordi et al. | 33/24 B |
| 1,148,397 | 7/1915 | Nelson | 409/134 X |
| 1,621,317 | 3/1927 | Eaton | 409/92 |
| 1,923,208 | 8/1933 | Howey | 409/92 |
| 2,344,849 | 3/1944 | Butler | 33/23 K X |
| 2,562,269 | 7/1951 | Gruettner et al. | 33/24 B |
| 2,699,606 | 1/1955 | Breau | 33/23 K X |
| 3,139,003 | 6/1964 | Mayor | 409/130 |
| 3,267,576 | 8/1966 | Heller | |
| 4,166,319 | 9/1979 | Rosenberg | 409/92 X |
| 4,317,287 | 3/1982 | Sausale | 33/24 R |
| 4,406,567 | 9/1983 | Samis | 409/92 |
| 4,591,304 | 5/1986 | Samis | 409/92 |

FOREIGN PATENT DOCUMENTS

| 509442 | 3/1952 | Belgium . |
| 89501 | 6/1895 | Fed. Rep. of Germany . |
| 413326 | 11/1923 | Fed. Rep. of Germany . |
| 1165464 | 12/1956 | Fed. Rep. of Germany . |

Primary Examiner—Z. R. Bilinsky
Attorney, Agent, or Firm—Austin R. Miller

[57] ABSTRACT

Apparatus for scribe engraving a workpiece with a miniature representation of a two-dimensional pattern in response to movement of a stylus following the pattern includes a spherically rotatable member having a frusto-spherical surface rotatably retained within a frusto-spherical bearing race remote from the pattern and having a passageway therethrough axially skew to the pattern, where the scribe extends fixedly from the spherically rotatable member for movement unitarily with the rotatable member, including means for connecting the rotatable member with the stylus so that the rotatable member rotates in response to stylus movement following the pattern where the connecting means is selectably disengageable from the rotatable member.

29 Claims, 18 Drawing Figures

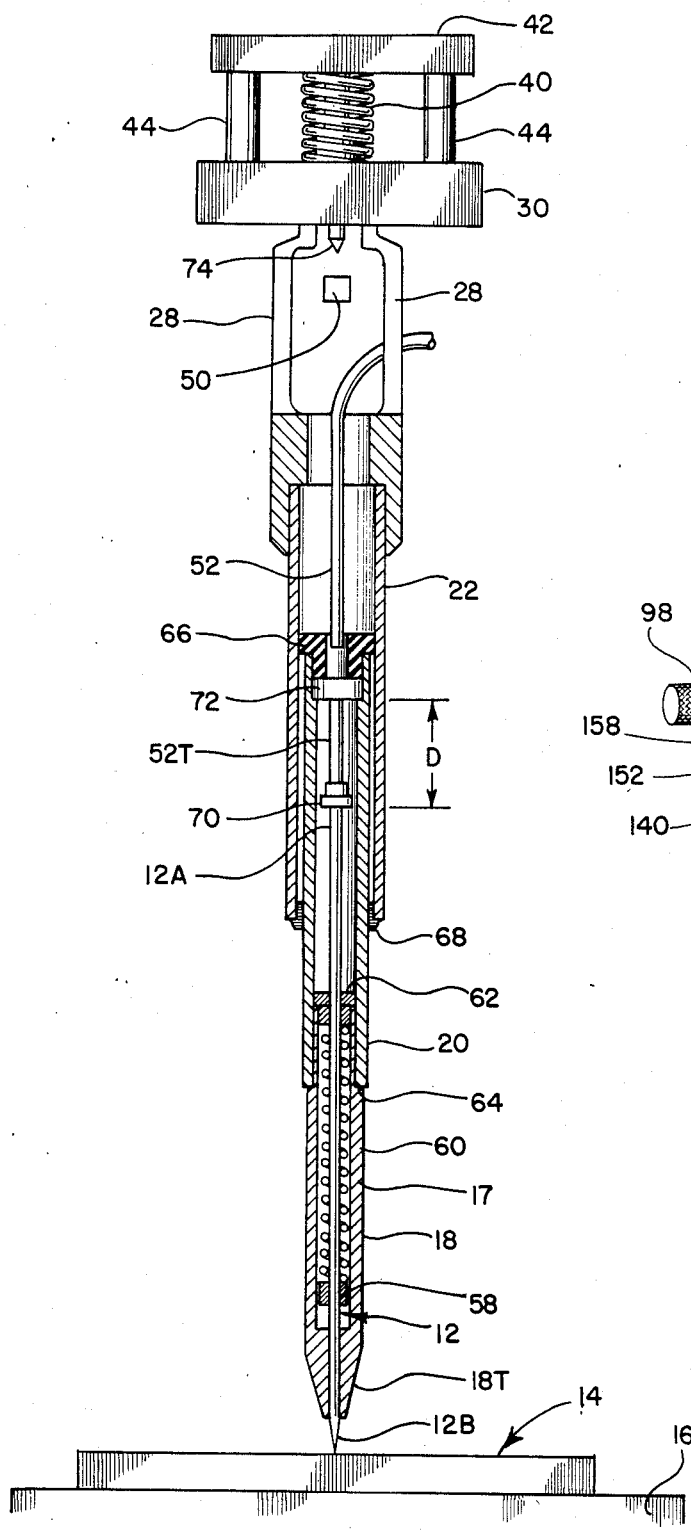
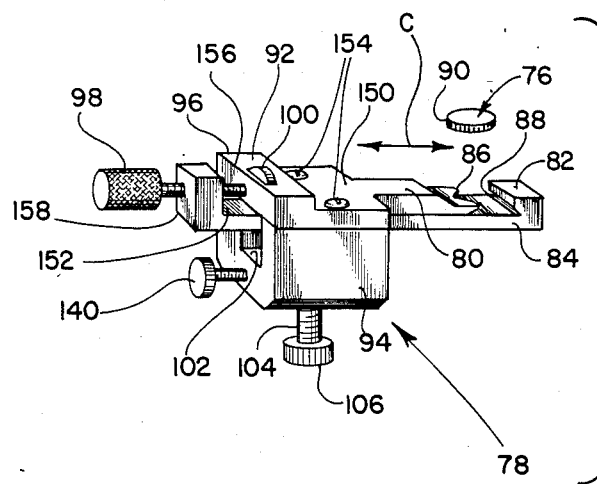
FIG.3
FIG.2

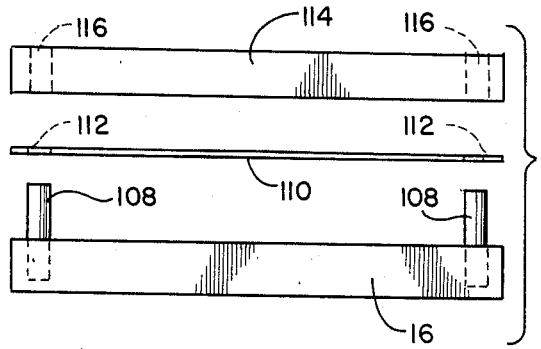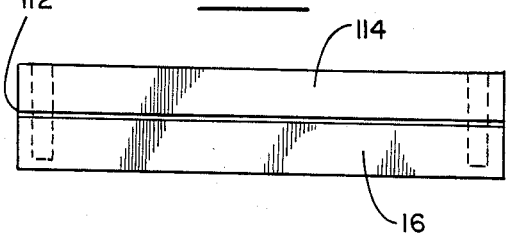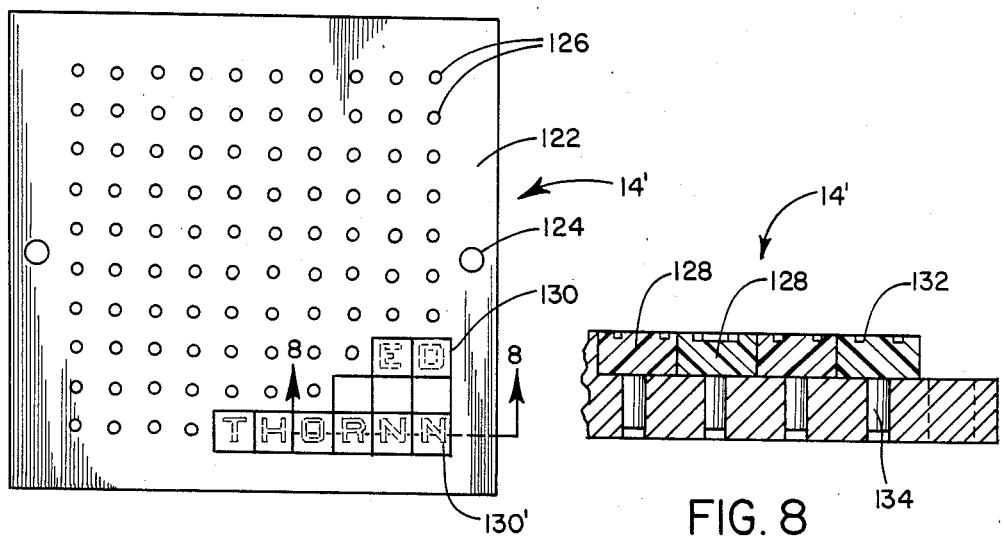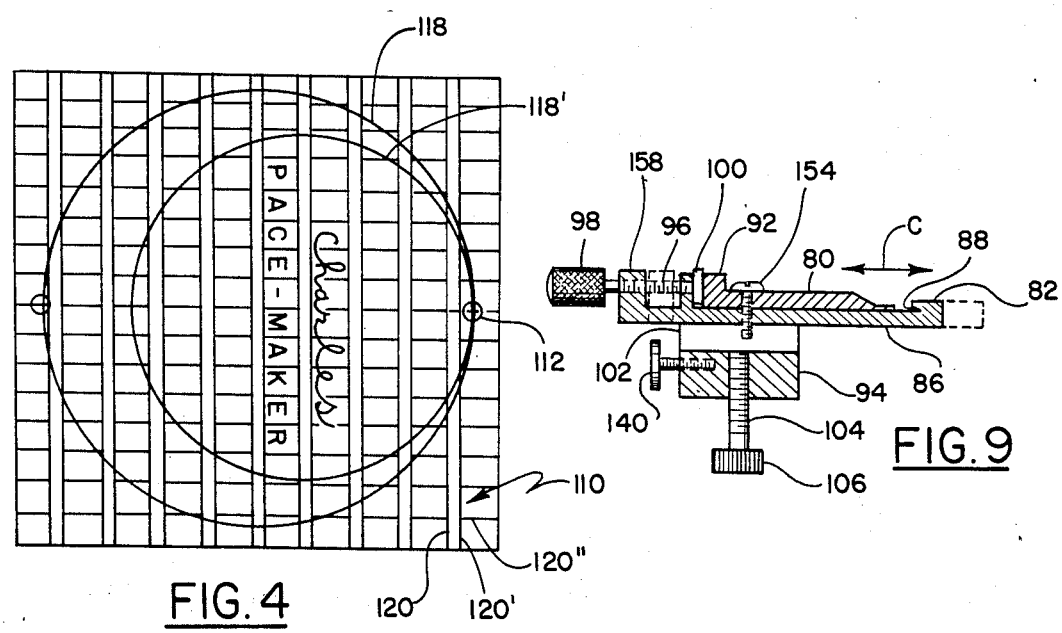

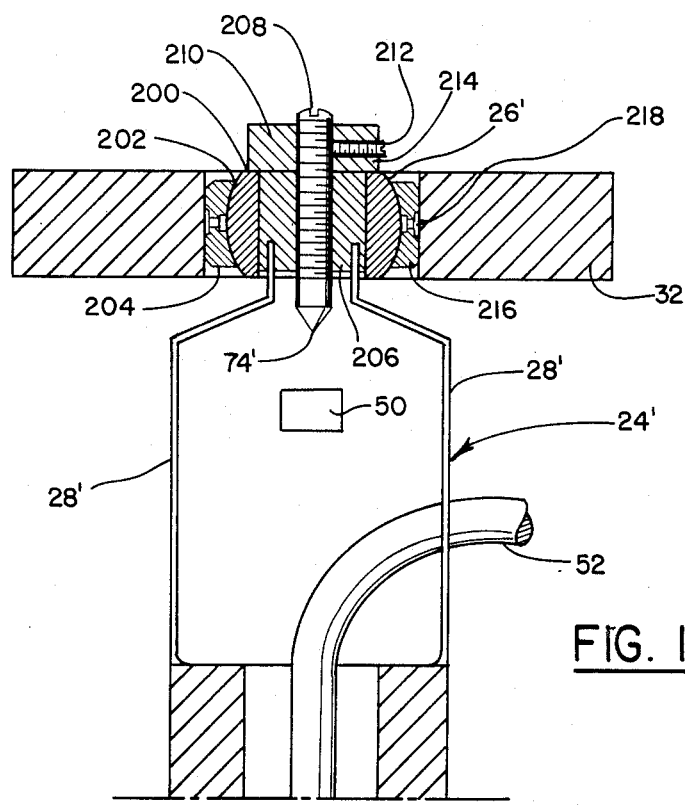
FIG. 10
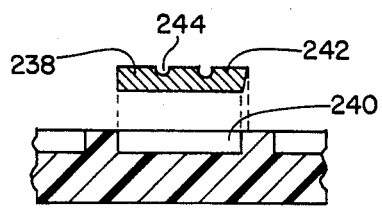
FIG. 13
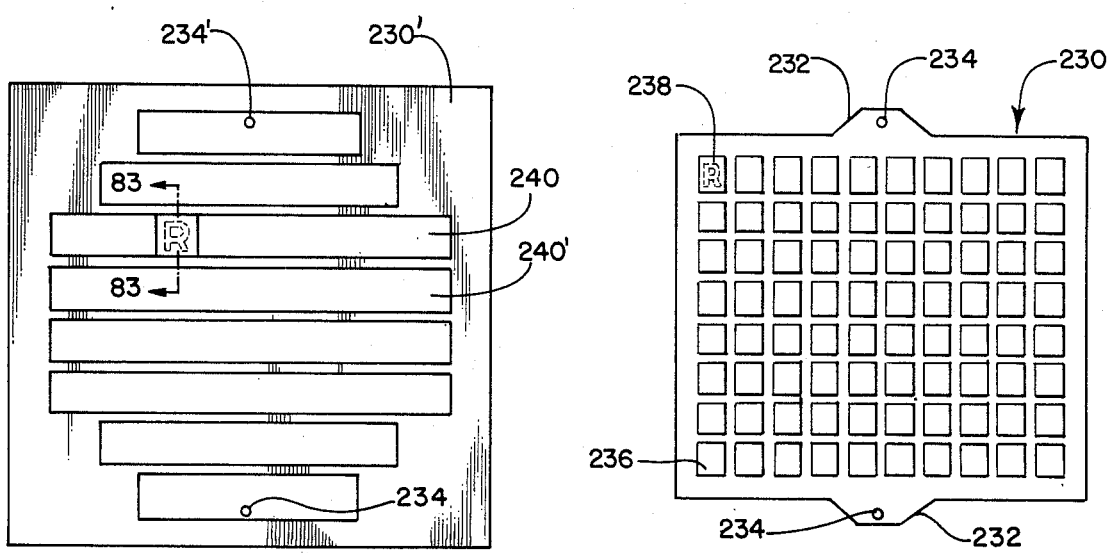
FIG. 12
FIG. 11

ENGRAVING APPARATUS HAVING IMPROVED BEARING AND PATTERN

CROSS REFERENCE TO RELATED PATENT APPLICATIONS

This patent application is a continuation-in-part of copending patent application Ser. No. 384,108, filed June 1, 1982 now U.S. Pat. No. 4,591,304 entitled *Engraving Apparatus*, and is also a continuation-in-part of copending patent application Ser. No. 189,022, filed Sept. 22, 1980 now U.S. Pat. No. 4,406,567 entitled *Apparatus for Engraving Indicia on Small Objects*.

BACKGROUND OF THE INVENTION

1. Field of the Invention

This invention relates to apparatus for engraving indicia, in greatly reduced form, on small workpieces in which an engraving scribe moves over the workpiece in the same general direction as a stylus following the pattern to be engraved on the workpiece.

2. Prior Art Known to Applicant

U.S. Pat. Nos. 4,254,552 and 4,317,287 disclose engraving apparatus and are acknowledged by applicant to be prior art but only with respect to subject matter which is (1) disclosed herein and/or in pending U.S. patent application Ser. No. 384,108 and (2) not disclosed in pending U.S. patent application Ser. No. 189,022.

Other prior art known to applicant includes U.S. Pat. Nos. 190,797; 517,680; 1,148,397; 1,621,317; 3,786,429; 3,857,025; 3,873,769; 3,964,168; and 1,923,208; 2,562,269; 4,166,319. Of these, '797, '680, '269 and, to the extent applicable, '287 are believed to be most relevant to the patentability of this invention.

SUMMARY OF THE INVENTION

This invention provides apparatus for scribe engraving a workpiece with a miniature representation of a pattern in response to movement of a stylus following the pattern, having a rotatable member, means connecting the scribe to the rotatable member for motion of the scribe with the rotatable member and means for mechanically connecting the rotatable member with the stylus so that the rotatable member rotates in response to stylus movement following the pattern. There is a spherically curved bearing race and the rotatable member includes a spherically curved surface portion rotatably retained within the race. There is also provided means for releasing the connecting member from the rotatable member, where the scribe extends from the rotatable member to a position intermediate a center of rotation of the rotatable member and the stylus, at which the scribe contacts the workpiece.

The means for connecting the rotatable member with the stylus is received within the rotatable member. The subspherical surface portion of the rotatable member may be frusto-spherical.

The connecting means may include a holding member retaining the stylus for axial sliding movement with respect thereto and means for biasing the stylus towards the pattern whenever the holding member is within a preselected distance of the rotatable member. Gripping means may be provided to tightly retain the workpiece. There may further be provided means for moving the gripping means into position for engraving contact of the scribe with the workpiece in response to axial movement of a holding member with respect to the stylus, in opposition to bias applied to the stylus as the stylus follows the pattern. Optionally provided are positioning means for repeatedly locating the gripping means in position for engraving contact of the scribe with the workpiece.

Stylus bias means resists relative axial movement of the holding means with respect to the stylus with force increasing with holding means movement towards the pattern. Means for moving the gripping means may be actuated by the stylus contacting the pattern when the stylus is within a preselected range of distances from the rotatable member.

The apparatus for scribe engraving may also include frame means receiving the spherically rotatable member for supporting the pattern remote from the rotatable member and proximate the stylus. The pattern may be defined by letter blocks retained within a grid where each of the letter blocks has alphanumeric indicia on a surface thereof. The grid may be connected to the frame and include means for releasably engaging the letter blocks with the alphanumeric indicia facing the stylus. The apparatus may also include means for locating the grid at a preselected position on the frame with respect to the rotatable member.

Different embodiments of patterns are useable with the same engraving apparatus. One embodiment of the pattern may include a two dimensional pattern supported by a base of the engraving apparatus with means provided for positioning the two dimensional pattern on the base and restraining the two dimensional pattern against movement when the stylus follows the pattern. Means may be provided for laminating the two dimensional pattern against the base where the laminating means is interposed between the pattern and the stylus and receives the stylus for stylus movement thereover following the pattern.

In another embodiment of the pattern there is provided an apertured block on the base below the stylus, means locating the apertured block at a predetermined position on the base below the stylus and a plurality of interchangeable guide blocks, having alphanumeric characters formed in upwardly facingly surfaces thereof. Means are provided to retain the guide blocks against movement with respect to the base.

Another aspect of the invention lies in providing a method for scribe engraving a workpiece with a miniature reproduction of a pattern followed by a stylus, by contacting the pattern with the stylus and increasing force with which the stylus contacts the pattern to thereby effect scribe-workpiece contact, moving the stylus over the pattern and simultaneously moving the scribe over the workpiece in unison with the stylus so that left-to-right and front-to-rear stylus movement respectively produce left-to-right and front-to-rear scribe movement on the workpiece and reducing substantially to zero the force with which the stylus contacts the pattern thereby to effect disengagement of the scribe and workpiece upon completion of engraving.

A further aspect of the invention lies in providing a matrix assembly of engravable wafer-like planar disk workpieces including a frame having an open center. A plurality of the workpieces are within the frame. Each workpiece is spaced from one another and from the frame. The workpieces are substantially coplanar with the frame and include leg members interconnecting the workpieces and the frame, substantially coplanar with the workpieces and the frame. Each workpiece has leg members extending from the workpiece, connecting either to another workpiece or to the frame and retaining the workpieces integrally one with another and with the frame. The leg members have portions of reduced cross section at leg member-workpiece juncture, facilitating separation of the workpieces from the assembly and facilitating separation of the leg members from the workpieces.

Another aspect of the invention lies in providing an assembly of an engravable wafer-like disk workpiece and a workpiece holder where the assembly is of unitary metallic construction and adapted for fracture release of the workpiece from the assembly. This assembly includes a wafer-like disk workpiece and a frame surrounding the workpiece and in generally coplanar disposition with the workpiece but separated from the workpiece. A tapered leg connects the workpiece with the frame and is coplanar with the workpiece and the frame. The leg tapers and has a thicker portion at either the frame or the workpiece and a thinner portion at the remaining end of the leg. The frame may have an outer periphery which is arcuate over a portion thereof and which is straight over another portion. This geometry facilitates retention of the assembly within gripping means of the engraving apparatus.

THE DRAWINGS

FIG. 2 is a front view; partially in section, of apparatus of FIG. 1 with the section taken at 2—2 in FIG. 1.

FIG. 3 is an enlarged view of workpiece holding apparatus embodying aspects of the invention.

FIG. 4 is a top view of a pattern template for use with the invention.

FIG. 5 is an exploded view illustrating the pattern template of FIG. 4 retained in position.

FIG. 6 is a view of components illustrated in FIG. 5 in assembled condition.

FIG. 7 is a top view of an alternate embodiment of a pattern for engraving with apparatus of the invention.

FIG. 8 is a partial sectional view taken at 8—8 in FIG. 7.

FIG. 9 is a vertical section of the apparatus illustrated in FIG. 3.

FIG. 10 is a broken sectional side elevation of an alternate embodiment of the upper portion of the apparatus illustrated in FIG. 1.

FIG. 11 is a plan view, taken at arrows 11—11 in FIG. 1, showing one embodiment of a positioning grid manifesting aspects of this invention.

FIG. 12 is a plan view taken at arrows 11—11 in FIG. 1, showing another embodiment of a positioning grid manifesting aspects of the invention.

FIG. 13 is a sectional view of the positioning grid of FIG. 12, taken at arrows 13—13 in FIG. 12 and depicting a letter block receivable by a channel in the positioning grid of FIG. 12, positioned above the channel and ready for receipt thereby.

Figure 1:
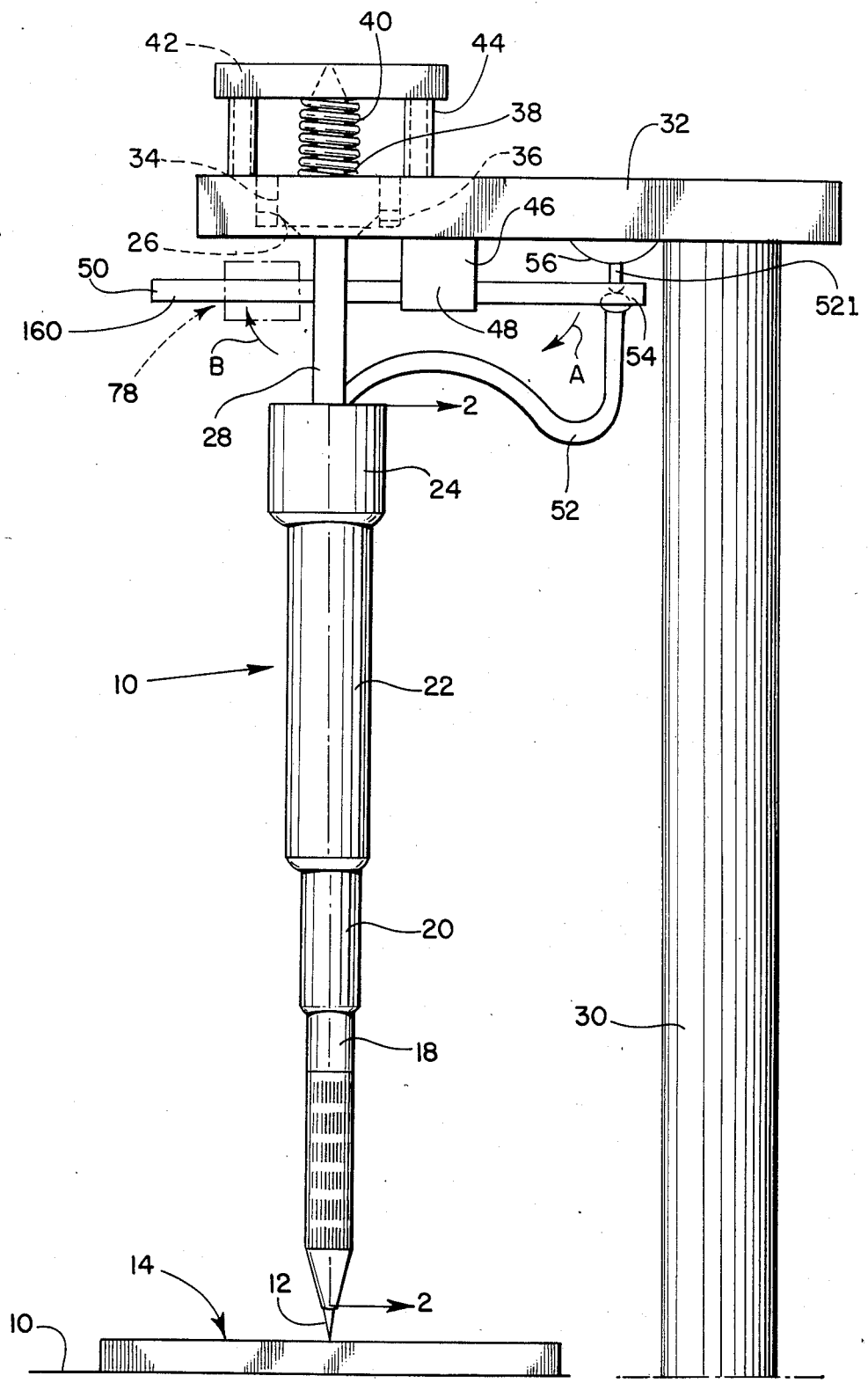
FIG. 1 is a side elevation of apparatus embodying aspects of the invention.

In the drawings and text, single and multiple prime notations denote alternate embodiments of correspondingly numbered elements lacking prime notation.

PREFERRED EMBODIMENTS OF THE INVENTION AND BEST MODE FOR PRACTICE THEREOF

Engraving apparatus embodying aspects of the invention is illustrated in FIG. 1 and is designated generally 10. Apparatus 10 includes a stylus 12 adapted to follow a pattern, designated generally 14 and mounted on a base 16 so that sliding movement of pattern 14 along base 16 is precluded. Stylus 12 is coaxially slidably retained within a knurled holder defined by an inner tube 18 received by an intermediate tube 20. An end of tube 20 opposite the end receiving inner tube 18 is received by outer tube 22. The end of outer tube 22 opposite that receiving intermediate tube 20 is fixedly received by a connecting member 24 which in turn is rigidly connected to a spherically rotatable member 26 via forks 28. With this arrangement two dimensional movement of stylus 12 following pattern 14 results in rotation of member 26.

A support column 30 extends upwardly from base 16 and is laterally displaced from pattern 14 to avoid interference with movement of stylus 12. A support beam 32 extends laterally from support column 30, over base 16, in cantilever fashion. Support beam 32 includes an aperture 34 therethrough which may be axially aligned with the tubular structure defined by the combination of stylus 12, inner tube 18, intermediate tube 20 and outer tube 22. Formed within aperture 34 may be a seat 36 receiving member 26.

Seat 36 permits spherical rotation of member 26 over a range to allow travel of stylus 12 over the entire surface of pattern 14. Accordingly, one suitable configuration of seat 36 is the right-angular configuration illustrated in dotted lines in FIG. 1 where the spherically curved outer surface of member 26 rotatably contacts the right-angle corner defining the seat. Of course, seat 36 may extend annularly entirely around pivot member 34 or may be defined merely by three or four corners on which pivot member 26 may rest. Seat 36 can also be configured as an annular ring of frusto-spherical shape or any other shape permitting free spherical rotation of member 26 over the range required to permit stylus 12 to trace the entirety of pattern 14. The center of rotation of member 26 is above the lower surface of beam 32.

Member 26 includes an upwardly extending knob 38. A resilient member 40, preferably in the form of a coil spring as shown, is maintained in the compression by pad 42 secured to support beam 32 by posts 44, fits about the exterior of knob 38 and biases member 26 downwardly against seat 36. This retains member 26 in position on seat 36 while permitting member 26 to rotate freely about its center of rotation in response to movement of stylus 12 following pattern 14.

Forks 28 are fixedly received by member 26.

A support block 46 is fixed to the underside of beam 32 and houses a fulcrum, designated schematically 48 in FIG. 1, to which a lever 50 is pivotally mounted. A flexible cable 52, operably connected to stylus 12, engages fitting 54 received in an end of lever 50 opposite the end proximate pivot member 26. Flexible cable 52 has inner and outer concentric sections, with the inner section being moveable axially with respect to the outer section. The outer section of cable 52 is secured to lever 50 by fitting 54 while the inner portion of cable 52, denoted 52T in FIG. 1, has an end abuttingly contacting a resilient means 56 secured to the underside of beam 32.

Resilient means 56 is sometimes referred to hereinafter as a second resilient means, to distinguish it from resilient member 40, sometimes referred to hereinafter as a first resilient means or member. Resilient means 56 may be a leaf spring, sponge rubber or any other material with similar resilient properties. Means 56 modulates variations in hand pressure applied to knurled holder 18 and translated to lever 50 by flexible cable 52, as described in more detail hereinbelow.

Relative movement between inner section 52T and the outer, unnumbered portion of cable 52, when inner portion 52I extends axially further upwardly with respect to fitting 54 in FIG. 1 while the outer portion of cable 52 remains fixed to fitting 54, causes fitting 54 and hence the end of lever 50 receiving fitting 54 to move downwardly, rotating about fulcrum 48 as indicated by arrow A in FIG. 1. This results in movement of the opposite end of lever 50 in the direction indicated by arrow B in FIG. 1.

As illustrated in FIG. 2, stylus 12 is retained coaxially within and is slidably moveable with respect to inner tube 18, with a portion of stylus 12 protruding from tapered end 18T of inner tube 18. A lower bushing 58 is secured to stylus 12 and abuts an end of a coil spring 60. Spring 60 is coiled about stylus 12 and is maintained in compression by abuttment, at the end thereof opposite lower bushing 58, against upper bushing 62 press fitted into the end of inner tube 18 opposite end 18T. Stylus 12 passes slidably freely through a central aperture in upper bushing 62.

Inner tube 18 has an external shoulder 64 against which a lower axial extremity of intermediate tube 20 abuts. Inner tube 18 is fixed with respect to intermediate tube 20 at juncture of the two tubes; the two tubes move together as a unitary structure.

At the end of intermediate tube 20 opposite inner tube 18 is closure bushing 66 press fitted within intermediate tube 20 and having exterior dimensions permitting freely telescoping movement of intermediate tube 20 (and hence inner tube 18) within outer tube 22.

The lower portion of outer tube 22 includes a guide bushing 68 fitted within the lower end of outer tube 22 and having inner diameter permitting telescoping movement of intermediate tube 20 within outer tube 22. Guide bushing 68 extends axially with respect to outer tube 22; this axial elongation in combination with contact between closure bushing 66 and the inner surface of outer tube 22 prevents intermediate tube 20 from wobbling with respect to outer tube 22. Due to the rigid, unitary construction of the combination of inner tube 18 and intermediate tube 20 and the support for intermediate tube 18 provided by closure bushing 66 and guide bushing 68, the inner, intermediate and outer tubes 18, 20, 22 remain coaxial during telescoping, as stylus 12 follows pattern 14.

Flexible cable 52 is preferably of the type used as a shutter trip for cameras. These cables have a slight spring bias of the inner cable portion 52I with respect to the outer portion; the inner portion is moveable axially with respect to the outer portion. In the embodiment illustrated in FIG. 2, a plunger 70 affixed to the end of inner cable portion 52I abuts but is not fixed to an end 12A of stylus 12, opposite the stylus end 12B following pattern 14.

Associated with flexible cable 52 is a collar 72. The outer portion of flexible cable 52 is immovable with respect to collar 72 but the inner portion 52I is moveable with respect to collar 72 and hence with respect to the outer cable portion upon depression of plunger 70. Collar 72 is retained within closure bushing 66 so that relative motion between collar 72, and hence the outer portion of flexible cable 52, and bushing 66 is precluded. Since bushing 66 is fixed to intermediate tube 20, relative motion between the outer portion of flexible cable 52 and intermediate tube 20 is prevented.

One version of a scribe 74, which extends fixedly downwardly from pivot member 26, is illustrated in FIG. 2.

FIG. 10 illustrates alternate embodiments of the upper portion of connecting member 24 and of rotatable member 26, designated 24' and 26' respectively. FIG. 10, being a sectional view taken as indicated by arrows 10—10 in FIG. 1, illustrates only structure which differs from that of FIGS. 1 and 2; to the extent structure is not shown in FIG. 10, the omitted structure is the same as that illustrated in FIGS. 1 and 2.

FIG. 10 illustrates flexible cable 52, lever 50, support beam 32 and forks 28' forming an upper extremity of connecting member 24'. In the embodiment illustrated in FIG. 10, rotatable member 26' includes a frusto-spherical member 200 having a curved exterior surface portion 202 rotatably retained within a frusto-spherically curved bearing race 204. Member 200 has a centrally located bore therethrough, not numbered in FIG. 10; the unnumbered central bore preferably has its axis passing through the center of rotation of member 26. The bore is preferably cylindrical and retains a cylindrical shoulder portion 206 of connecting member 24'. Cylindrical shoulder portion 206 includes a threaded central bore, not numbered in FIG. 10, receiving an axially elongated threaded fastening member 208. Member 208 includes a head portion 210 externally overlying shoulder 206 at a surface thereof opposite from connecting member 24'. Head 210 retains shoulder 206 within the bore formed in rotatable member 200 by overlying such bore and precluding downward movement of shoulder 206 out of the bore in member 200, as shown in FIG. 10. Head portion 210 is retained in engagement with member 208 by set screw 212 threadly engaging an unnumbered bore in head 210 and contacting member 208 transversely to the axis thereof. A washer 214 may be provided between head portion 210 of member 208 and shoulder 206.

It is preferable that axially elongated threaded member 208 extend entirely through shoulder 206 and have scribe 74 formed thereon at an end thereof remote from head portion 210.

Frusto-spherically curved bearing race 204 is retained within a bore 26 in support beam 32 by suitable conventional means such as may include an O-ring 218. Bore 216 preferably has an axis perpendicular to base 16 of engraving apparatus 10. Shoulder 206 is preferably cylindrical and shoulder 206, threaded member 208 and bore 216 are all preferably coaxial with one another and remain coaxial with stylus 12 and telescoping connecting means 24 as stylus 12 moves over the pattern and rotatable member 26 rotates.

As illustrated in FIG. 10, the curved surfaces of member 200 and race 204 are preferably spherically curved surfaces of frusto-spherical configuration, where the frusto-spherical shape is defined by a sphere truncated by two parallel imaginary planes which are parallel to the upper and lower unnumbered surfaces of support beam 32. This frusto-spherical character of the complemental surfaces of member 200 and race 204 permits a satisfactorily wide range of motion of rotatable member 26' and hence of connecting means 24' and stylus 12. However, due to the frusto-spherical configuration of member 200 and race 204, the movement of stylus 12 in the plane of pattern 14 is limited by interference of forks 28' with race 204.

The preferred coaxial characteristic of bore 216, cylindrical shoulder 206, threaded member 208, connecting member 24' and stylus 12 means that bore 216 and the unnumbered passageways through member 200, race 204 and shoulder 206 are skew to pattern 14.

The frusto-spherical surface of race 204 contacting member 200 defines a seat receiving member 200. Race 204, being received within beam 32 is effectively received by the frame of the engraving apparatus defined by beam 32, support column 30 and base 16.

The combination of shoulder 206, receiving forks 28', threaded member 208 and head portion 210 define means for selectably releasing connecting means 24' from rotatable member 26'. As can be seen from FIG. 10, upon rotation of set screw 212 away from threaded member 208, head 210 can be removed from member 208, permitting shoulder 206 and hence forks 28' to be slidably removed from the bore through member 200. This facilitates rapid replacement of connecting means 24, stylus 12, spring 17 and associated structure upon failure of any of these components.

A workpiece which may be engraved utilizing the invention and a workpiece holder manifesting aspects of the invention are illustrated in FIG. 3 where the workpiece is a generally cylindrical chip or disk denoted 26. The workpiece holder is designated generally 78 and includes a pair of jaws 80, 82 where jaw 80 is fixed and jaw 82 is moveable back and forth in the direction indicated by double-ended arrow C. Fixed jaw 80 is part of a top plate member 50. Moveable jaw is formed as part of a reciprocable plate member 84 which is slideably moveable within a channel machined in a support block 94. Respective fixed and moveable jaws 80, 82 have respective facing undercut jaw surfaces 86, 88; the undercuts are best seen in FIG. 9. The facing undercut jaw surface 88 of moveable jaw 82 is formed along a line transverse to the directions indicated by arrow C. The facing undercut jaw surface 86 of fixed jaw 80 is formed in a "Vee" shape, with the "Vee" disposed symmetrically with respect to the direction of travel defined by arrow C and the open end of the "Vee" facing moveable jaw 82, as shown in FIG. 3. When a workpiece 76 is positioned on plate member 84 and moveable jaw 82 is closed towards fixed jaw 80, facing undercut surfaces 86, 88 tightly press against the curved lateral surface 90 of workpiece 76, retaining workpiece 76 immovably with respect to workpiece holder 78.

The longitudinally elongated plate member 84 resides in a rectangular channel, not numbered, machined in suport block 94, and is moveable slidably therealong in the directions indicated by double ended arrow C. Elongated plate 84 is retained within the channel formed in support block 94 by sandwich action of top plate 150 which is retained against an upper surface 152 of plate member 84 by screws 154 passing through holes in top plate 150 and received by threaded bores in support block 94. Fixed jaw 80 is an extension of top plate 150 and has a planar underside for slidable facing contact with surface 152 of moveable elongated plate 84. Top plate 150 further includes a built-up portion 156 in which is formed a T-shaped slot, not numbered, receiving a circular disk 100 in the top portion of the T for rotary movement of a disk 100 with respect thereto. Disk 100 is fixed to a threaded shaft 96 to which is connected a knurled knob 98 at the end opposite disk 100 for unitary rotation of members 96, 98, 100.

An upstanding shoulder 158 of elongated plate 84 extends upwardly with respect to planar surface 152 and has a threaded passageway for engagement with shaft 96. The passageway is parallel with the direction of movement of plate 84, defined by the channel in support block 94. Rotation of knurled knob 98, resulting in rotation of shaft 96 with respect to shoulder portion 158, produces movement of plate 84 in direction indicated by arrow C as shoulder 158 moves along shaft 96. This movement of plate member 84 results because disk 100 is within and rotatable with respect to portion 156 f top plate 150 but is not moveable, in the directions indicated by arrow C, with respect thereto. Consequently, upon rotation of shaft 96, plate member 84 moves as indicated by arrow C.

A rectangularly cross-sectioned passageway 102 is provided in support block 94 for receipt thereby of lever 50. Gripping means 78 can be moved along lever 50 to position workpiece 76 underneath scribe 74 for engraving the workpiece. A bolt 104 threadedly engages an internally threaded vertical bore in support block 94, which bore communicates with passageway 102 so bolt 104 can be tightened against lever 50 to retain gripping means 78 in a selected position for engraving of workpiece 76 by scribe 74.

A positioning screw 140 threadedly engages an internally threaded horizontal bore formed in support block 94, which horizontal bore is parallel with and preferably disposed below passageway 102. The threaded horizontal bore is located so that the head of positioning screw 140 interferes with lever 50 after lever 50 has been inserted through passageway 102, from right to left in FIG. 3. By rotating positioning screw 140 thereby moving the head of screw 140 in the directions indicated by arrow C and varying the distance from fixed jaw 80 at which lever 50 interferes with screw 140, gripping means 78 can be repeatedly located in the same position along lever 50, for engraving of workpiece 76.

Movement of plate member 84 and hence moveable jaw 80 is illustrated schematically in FIG. 9, where plate member 84 is shown in two different positions, one in section and one in phantom.

Rotation of knob 98 provides venier action permitting moveable jaw 82 to be tightened to the desired amount against workpiece 76.

A feature of major importance is the tactile sensation provided to the operator when the operator actuates inner tube 18 (1) to rotate lever 50 and contact workpiece 76 with stylus 74 and (2) to guide stylus 12 along pattern 14.

When an operator first grasps inner tube 18, in the manner of grasping a conventional lead pencil when preparing to write, the unitary combination of inner tube 18-intermediate tube 20 is freely moveable axially with respect to outer tube 22, and workpiece 76 is remote from scribe 74. As the user moves inner tube 18 and hence stylus 12 downwardly, movement of the combination of inner tube 18-intermediate tube 20 is smooth, sliding movement with slight resistance provided by sliding contact between intermediate tube 20 and the interior of guide bushing 68 and between the interior of outer tube 22 and closure bushing 66. As the combination of inner tube 18-intermediate tube 20 continues downward and stylus 12 contacts pattern 14, the operator, holding inner tube 18 like a pencil, exerts slight downward pressure, similar to the pressure exerted when writing.

This downward pressure compresses spring 17 between upper bushing 62, which is fixed to and hence moves unitarily with inner tube 18, and lower bushing 58, fixed to stylus 12. Since stylus 12 is in contact with pattern 14, stylus 12 and hence lower bushing 58 cannot move further vertically downwardly. However, inner tube 18 and hence upper bushing 62 can move downwardly, with respect to stylus 12, in response to the operator-applied pressure since stylus 12 is slidably coaxially resident within inner tube 18 and cannot move downwardly in response to the operator-applied pressure. This results in relative vertically upward movement of stylus 12 with respect to the unitary combination of inner tube 18-intermediate tube 20, with bushing 58 compressing spring 17 and stylus 12 pushing against plunger 70 thereby decreasing distance D in FIG. 2. (Distance D is the distance between moveable plunger 70 and fixed collar 72. Collar 72 is stationary due to its connection with bushing 66.)

As plunger 70, which is fixed to inner portion 52I of flexible cable 52, moves vertically upwardly in FIG. 2, inner cable portion 52I attempts to move axially upwardly (with respect to the outer portion of flexible cable 52 and hence with respect to fitting 54 in FIG. 1) against resilient means 56. This results in downward movement of the end of lever 50 retaining fitting 54. This in turn produces rotation of lever 50 about fulcrum 48, in directions indicated by arrows A and B in FIG. 1, urging workpiece 76 into engagement with scribe 74. Once workpiece 76 contacts scribe 74, the operator proceeds with engraving by following pattern 14 with stylus 12. Workpiece holder 78 illustrated in FIG. 3 has not been illustrated positioned on lever 50 in either FIG. 1 or 2 to facilitate drawing clarity.

When the operator has finished engraving by completely following pattern 14 with stylus 12, the operator lifts inner tube 18. This permits spring 17 to relax, causing downward motion of stylus 12 with respect to inner tube 18 in FIG. 2. This increases distance D in FIG. 2 with lever 50 rotating about fulcrum 48 in a direction opposite that indicated by arrows A and B in FIG. 1, removing workpiece 76 from contact with scribe 74. As the operator continues raising holder 18 from pattern 14, spring 17 elongates and urges bushing 58 against the lower interior extremity of holder 18. Continued lifting of holder 18 from pattern 14 lifts stylus 12 from pattern 14. Stylus 12 and holder 18 move unitarily when spring 17 has urged bushing 58 against the lower interior extremity of holder 18 with stylus 12 protruding a maximum distance out of tip portion 18T of holder 18.

Outer tube 22 is tightly retained within connecting member 24; there is no relative motion therebetween.

If pattern 14 is removed or if holder 18 is displaced laterally, allowing spring 17 to urge bushing 58 against a lower interior extremity of holder 18, the inner tube 18-intermediate tube 20 combination is freely moveable within outer tube 22. Only when stylus 12 is pressed against a pattern and forced to retract slightly within holder 18 against bias of spring 17 does stylus 12 contact plunger 70 and thereby rotate lever 50 to position the workpiece against scribe 74. So long as stylus 12 is pressed against pattern 14 by application of force to holder 18, lever 50 is displaced and maintains the workpiece in engraving contact with scribe 74. Scribe 74, being of fixed length and connected to pivot member 36, actually moves in a curved plane of frusto-spherical configuration. Workpiece 76 is preferably planar. Thus the apparatus facilitates engraving of a two-dimensional pattern onto a flat workpiece with a scribe which moves in a curved two-dimensional plane.

The inner tube 18-intermediate tube 20 combination may be lifted upwardly in FIG. 2 to a position at which tip 18T is sufficiently removed from pattern 14 that stylus 12 protrudes the maximum distance from tip 18 and spring 17 forces bushing 58 against the lower interior extremity of holder 18. At this position the inner tube 18-intermediate tube 20 combination is again freely telescopingly moveable within outer tube 22 and lever 50 is positioned with the workpiece removed from scribe 74.

In the absence of compression of spring 17, distance D in FIG. 2 remains fixed with no relative movement resulting between inner and outer portions of flexible cable 52. In the absence of relative movement between the inner and outer portions of flexible cable 52, lever 50 remains positioned so that workpiece holder 78, and hence workpiece 76, is remote from scribe 74. Consequently the combination of stylus 12, spring 17, the inner tube 18-intermediate tube 20 combination, flexible cable 52, bushings 58 and 66 and associated structure actuate lever 50 only when the inner tube 18-intermediate tube 20 combination is at an intermediate range of positions along the axial length of outer tube 22 and the stylus is contacting the pattern. Since outer tube 22 is fixed with respect to rotatable member 26, lever 50 is actuated only when inner tube 18 (and hence intermediate tube 20) is within a preselected range of distances from rotatable member 26 and spring 17 is compressed due to force applied to the tip of stylus 12, typically by contact thereof with the pattern.

If the inner tube 18-intermediate tube 20 combination is too close to the upper extremity of outer tube 22, stylus 12 protrudes the maximum amount from tip 18T in response to bias of spring 17, because tip 18T is further removed from pattern 14 than the maximum distance stylus 12 can protrude from inner tube 18. Consequently, no reduction in distance D in FIG. 2 results, with consequent lack of rotation of lever 50 about fulcrum 48. Similarly, if the inner tube 18-intermediate tube 20 combination is located too close to the lower end of outer tube 22 in FIG. 2 (this can result if the telescoping combination of tubes 18, 20 and 22 is swung about pivot member 26, laterally of base 16), spring 17 again elongates, urging bushing 58 against the lower interior extremity of tube 18, forcing stylus 12 to protrude out of holder 18 by the maximum amount; no reduction in distance D results. Without reduction in distance D, no relative motion results between the inner and outer portions of flexible cable 52. Consequently, there is no rotation of lever 50 about fulcrum 48.

FIGS. 4, 5 and 6 together illustrate an embodiment of a pattern 14 which can be used with the engraving apparatus. In FIGS. 4, 5 and 6 base 16 has two posts 108 protruding therefrom on opposite sides. A paper pattern template 110 includes apertures 112 of suitable diameter for fitting over posts 108 to position template 110 on base 16. A laminating sheet 114 having apertures 112 may be provided for sandwiching paper pattern template 110 against base 16. The completed sandwich is illustrated in FIG. 6.

Paper pattern template 110 may include circular indicia 118, 118' which indicate the pattern boundary corresponding to circular edge 90 of workpiece 76. When an operator engraves a workpiece 76 utilizing a paper pattern template 110 as illustrated in FIG. 4, if the operator positions stylus 12 outside the appropriate circle scribe 74 will no longer contact the circular surface of workpiece 76 to be engraved. As illustrated, two circular indicia, corresponding to two different diameter workpieces 76, may be provided on one template. Similarly, sets of horizontal and vertical lines 120, 120', 120" may be provided on template 110 for guiding the individual operator as he creates the pattern to be engraved.

For example, an individual may write his or her name on a line 120 in script as shown in the drawings. This may be above or below an identification mark or name which has been preprinted. The individual may then use the apparatus to engrave his or her name and the identification mark or name on a workpiece 76 by following the script and the pre-printed mark or name with the stylus.

The invention may be used, for example, to engrave chips of both 0.020 and 0.025 inch diameters. The paper pattern template illustrated in FIG. 4 with two circular indicia may have the indicia tangent, as illustrated, so that the template may be used with either diameter chip. The tangent characteristic of the pattern indicia results from the fact that a workpiece to be engraved is pressed against stationary jaw 80 by moveable jaw 82 in workpiece holder 78. Consequently circular workpieces of different diameters may have their centers at different positions on plate 84 during engraving. However circular workpieces of different diameters rest against the same surface of fixed jaw 80, providing a reference position corresponding to the point of tangency between the circles illustrated in FIG. 4.

Another embodiment of a pattern, denoted generally 14', is illustrated in FIGS. 7 and 8. In this embodiment a regularly apertured plate 122 has fitting apertures 124 sized for engagement over positioning posts 108 on base 16 in FIG. 5. Plate 122 includes a plurality of regularly and symmetrically spaced apertures 126, referred to as lettering apertures to distinguish them from apertures 124. A plurality of interchangeable guide blocks 128 are provided with each guide block 128 having at least one alphanumeric character 130 formed in an upwardly facing surface 132 thereof. Each alphanumeric character 130 is preferably engraved on or otherwise recessed within surface 132. Each guide block 128 includes a protruding male member 134 sized for fitting into one of lettering apertures 126.

An operator can form any desired alphanumeric pattern utilizing guide blocks 128. If the guide blocks abut they retain each other in position as the stylus is moved from block to block, following the alphanumeric characters the operator desires to engrave onto the workpiece. Alternately, guide blocks 128 or just male member portions 134 thereof may be manufactured of flexible rubber, plastic or a similar resilient material. In such case, male member portions 134 may be force fitted into lettering apertures 126, to retain guide blocks 128 in position.

FIGS. 11, 12 and 13 show alternate embodiments of apparatus defining the pattern followed by the stylus to engrave a miniature representation of the pattern on a workpiece by contact of the workpiece with the scribe. FIG. 11 illustrates a generally rectangular positioning grid designated generally 230 adapted for placement on base 16 as indicated by arrow 14 in FIG. 1. Grid 230 forms one component part of pattern 14 and includes two ear portions 232 having apertures 234 therethrough, dimensioned to receive posts 108 protruding upwardly from base 16. Ears 232, apertures 234 and posts 108 in combination locate positioning grid 230 at a preselected position on frame 16 with respect to rotatable member 26.

Grid 230 includes receptacles 236 for receiving therewithin and for releasably retaining letter blocks. A typical letter block is illustrated as 238 in FIG. 11 and is shown in section in FIG. 13. The letter blocks are preferably of rectangular solid configuration and have alphanumeric indicia, such as the letter R shown in FIG. 11, formed on a surface 240 which preferably faces stylus 12 when letter blocks 238 are positioned within receptacles 236.

Positioning grid 230 is preferably a rubber-like deformable material so that letter blocks 238 can be pushed into receptacles 236 and retained by such receptacles as the receptacle walls slightly spread apart when letter blocks 238 are pushed thereinto.

FIG. 12 illustrates an alternate embodiment of a positioning grid 230' where grid 230' includes channels 240 formed therein for receiving one or a plurality of letter blocks 238 with one such letter block being illustrated in position in FIG. 12. Grid 230' illustrated in FIG. 12 also includes apertures 234' functioning the same as apertures 234 illustrated in positioning grid 230 shown in FIG. 11 and described in connection therewith. Channels 240 have varying lengths, with the longer channels in the center of positioning grid 230' so that when letter blocks 238 fill channels 240, a suitable pattern may be engraved on the face of a circular workpiece. Indeed, if the outer peripheries of channels 240 in FIG. 12 are connected together, the connecting line generally defines a circle centered at the center of positioning grid 230' in FIG. 12.

FIG. 13 illustrates a letter block 238 ready for insertion into a channel 240 in FIG. 12. The surface of letter block 238 have alphanumeric indicia formed thereon is designated 242 in FIG. 13 while the alphanumeric indicia themselves are indicated as 244 and are shown in FIG. 13 as slight depressions in surface 242. These depressions permit the alphanumeric indicia 244 to be easily followed by stylus 12.

Figure 14:
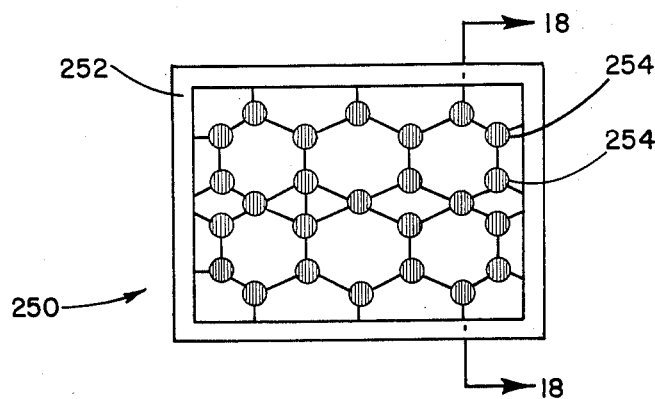
FIG. 14 is a plan view of a matrix assembly of engravable wafer-like planar disk workpieces, manifesting aspects of the invention.
Figure 18:
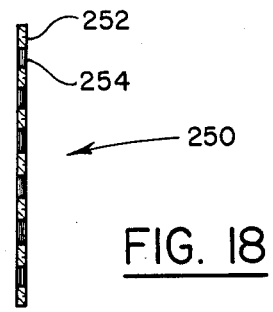
FIG. 18 is a sectional view taken at arrows 18—18 in FIG. 14.

FIGS. 14 and 18 illustrate a matrix assembly of engravable wafer-like planar disk workpieces where the assembly is adapted for fracture release of the disk workpieces from the matrix. The matrix assembly is designated generally 250 and includes a flat frame 252 having an open center where the wafer-like planar disk workpieces designated generally 76' are within the open center of the frame and are spaced from one another and from the frame. The workpieces in FIGS. 14 and 18 are designated 76' to distinguish them as alternate embodiments of workpiece 76 illustrated in FIG. 3. The workpieces and frame are substantially coplanar. Interconnecting the workpieces and the frame are leg members 256 where each workpiece 76' preferably has three legs 256 extending therefrom. Each of legs 256 connects either two workpieces 76' or a workpiece 76' and frame 252. The plurality of legs 256 thereby retain workpieces 76' integrally one with another and with frame 252. Legs 256 preferably have reduced cross section at leg member-workpiece juncture, to facilitate fracture separation of the workpieces from the assembly and also to facilitate fracture separation of the leg members from the workpieces. The legs protrude from the curved lateral surfaces 90 of workpieces 76'. The workpieces 76' are preferably circular. Assembly 250 is preferably of unitary metallic construction.

Figure 15:
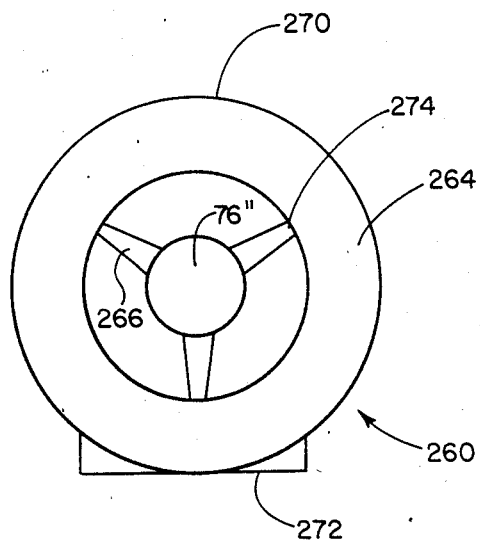
FIG. 15 is a plan view of a preferred embodiment of an engravable wafer-like disk workpiece-workpiece holder assembly manifesting aspects of the invention.
Figure 16:
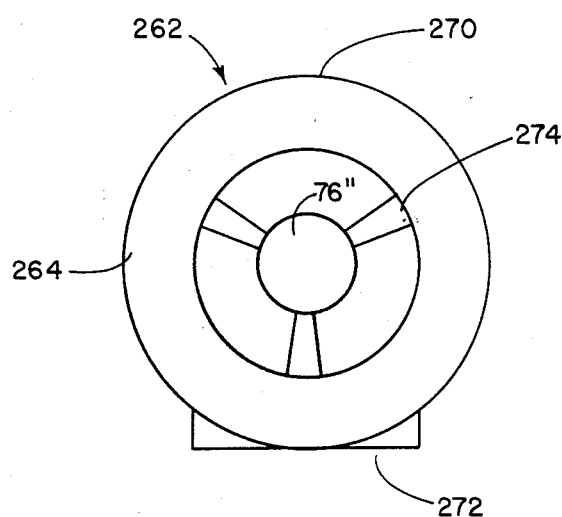
FIG. 16 is a plan view of an alternate embodiment of an engravable wafer-like disk workpiece-workpiece holder assembly manifesting aspects of the invention.

FIGS. 15 and 16 illustrate two embodiments of another engravable wafer-like disk workpiece-workpiece holder assembly. Each of these assemblies is preferably of unitary metallic construction and is adapted for fracture release of the disk-like workpiece 76" from the assembly. The workpieces in FIG. 15 and 16 are designated 76" to distinguish them as alternate embodiments of workpiece 76 illustrated in FIG. 3 and of workpiece 76' illustrated in FIGS. 14 and 18. The assembly of FIG. 15 is designated generally 260 while the assembly of FIG. 16 is designated generally 262. Each assembly includes the wafer-like disk workpiece 76' located at the center thereof and has a frame designated 264 of generally annular configuration surrounding and spaced away from workpiece 76". Frame 264 is flat, like workpiece 76. Tapered legs designated 266 and 268 respectively in FIGS. 15 and 16 connect workpiece 76" with frame 264. Workpiece 76", frame 264 and legs 266 and 268 are preferably coplanar. In FIG. 15 legs 266 taper from a cross section of greater thickness at leg 266-workpiece 76" juncture to a cross section of lesser thickness at leg 266-frame 264 juncture. Legs 268 in FIG. 16 taper from a lesser cross section at leg 268-workpiece 76" juncture to a greater cross section at leg 268-frame 264 juncture. In the embodiments illustrated in FIGS. 15 and 16, legs 266, 268 are evenly spaced one from another about workpieces 76". In the embodiments of FIGS. 15 and 16, frame 264 has an outer periphery which is arcuate over a portion thereof, which portion is denoted generally 270, and is straight over another portion, denoted generally 272 in FIGS. 15 and 16.

In the embodiments of the assemblies illustrated in FIGS. 15 and 16 creases, denoted generally 274 and which are areas of reduced cross section, are provided at leg-frame juncture and at leg-workpiece juncture. Creases 274 are of lesser thickness than the otherwise preferably uniform thickness of frames 260, 262, workpieces 76" and legs 266, 268, and facilitate fracture separation of workpieces 76" from frames 260, 262 and facilitate fracture separation of legs 266, 268 from workpieces 76", to provide a standalone circular disk-like workpiece 76".

Figure 17:
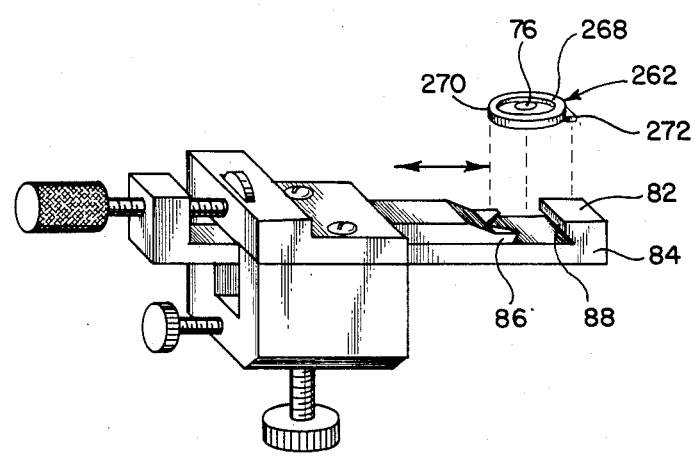
FIG. 17 is a perspective view of workpiece holding apparatus manifesting aspects of the invention with an engravable wafer-like disk workpiece-workpiece holder assembly, as illustrated in FIG. 16, depicted above the apparatus, ready for retention thereby.

FIG. 17 illustrates the assembly of FIG. 16 positioned above and ready for placement in workpiece holder 78', which is similar to workpiece holder 78 in FIG. 3. FIG. 17 illustrates undercut jaw surface 88 of movable jaw 82 and undercut jaw surface 86 of fixed jaw 80. Movable jaw 82, having undercut surface 88 which is transverse to the direction of travel of movable jaw 82, is particularly well adapted to receive transverse portion 272 of frame 264 of assembly 62. Similarly, undercut jaw surface 86, having the Vee-like configuration shown in FIG. 17, is well adapted to retain arcuate portion 270 of frame 264 by contact thereagainst when the jaws are closed against workpiece assembly 262.

Workpieces engraved utilizing apparatus disclosed herein may be placed in dentures or in natural teeth.

The workpieces may be engraved with identification data, such as the patient's name and social security number, tooth shade and mold data, the patient's dentist's name, critical health information concerning allergies, blood type, diabetic or epileptic status, presence of a pacemaker or other vital prostheses or with other important data such as credit card numbers, passport numbers, safe deposit box numbers and the like. The workpieces may be supplied in different colors and/or may be made of different materials. Different types of data may be engraved on workpieces of each color and/or material. Several workpieces containing different types of information may be implanted in the patient's dentures or in natural teeth.

As with the apparatus disclosed in both parent applications hereto, engraving the workpiece at a position between the center of rotation of the rotatable member and the stylus insures that movement of the scribe over the workpiece is always in a direction corresponding to movement of the stylus over the pattern. A forward writing effect results with the scribe moving in response to stylus movement so that left-to-right and front-to-rear stylus movement over the pattern respectively produces left-to-right and front-to-rear scribe engraving of the workpiece.

The familiar force-distance characteristic of coil springs permits the feature whereby as the user applies downward force to inner tube 18, increasing resistance to further downward movement of inner tube 18 results as coil spring 17 compresses.

For a given geometry of workpiece holder 78 and lever 50, indicia 160, illustrated in FIG. 1, may be provided on lever 50 to facilitate accurate positioning of workpiece holder 78 therealong. This permits proper engagement of the scribe and the workpiece for successful engraving upon rotation of lever 50 moving workpiece 76, carried by workpiece folder 78, into position against scribe 74. A "double slip" effect is provided by telescoping action of inner tube 18-intermediate tube 20 combination within outer tube 22 and by increasing resistance provided by spring 17 as the user urges inner tube 18 downwardly, pressing stylus 12 against the pattern. This double slip effect produces a natural writing feel. Initial lowering of the inner tube 18-intermediate tube 20 combination, and hence of stylus 12, places the point of stylus 12 on the pattern as inner tube 18-intermediate tube 20 combination slides freely within outer tube 22. Only a slight, sliding resistance is experienced by the user in moving the inner tube downwardly to position the stylus on the pattern. Increased resistance is experienced as the user urges inner tube 18 downwardly against force of spring 17; this provides the natural writing feel.

Workpiece 76 may be plated with different colors for color coding according to the type of information on a given chip—critical health information might be on a blue chip while miscellaneous information might be on a gold chip.

A major advantage is that this forward writing effect engraving apparatus can be operated with one hand, permitting lay people to engrave a workpiece. The forward writing effect in combination with the natural writing feel makes the user psychologically comfortable while following the pattern with the stylus and engraving the workpiece with the scribe. This is especially important when an older person, perhaps in a dentist's office, utilizes the engraving apparatus to engrave a miniature representation of their name on a workpiece.

The apparatus and method facilitate such engraving when the person has previously written their name on a paper template portion 110 of pattern 14.

As yet another design for pattern 14, there may be provided a series of running channels on base 16, between which guide blocks, having upwardly facing alphanumeric indicia preferably formed as depressions in surfaces of the blocks, may fit. The alphanumeric characters preferably have rounded corners to facilitate tracking with the stylus. The channels between which the guide blocks fit may be plastic or metal. It is desirable that either or both the guide blocks and the channels be compressible, resilient material such as rubber.

The paper template 110 may include a clear plastic laminate, scored at one corner to permit peel-off of the clear plastic. If the plastic laminate has a moderately sticky adhesive on the underside, the peeled off laminate may thereafter be pressed against the workpiece to provide a handle for the small workpiece. This handle is more easily grasped by adult fingers than is the workpiece since the workpiece may be very small.

I claim:

1. In apparatus for scribe engraving a workpiece with a miniature representation of a pattern in response to movement of a stylus following said pattern, including:
   (a) a spherically rotatable member;
   (b) means for connecting said scribe with said spherically rotatable member for effecting motion of said scribe with said rotatable member as said rotatable member rotates;
   (c) means for connecting said rotatable member with said stylus for effecting rotatable member rotation in response to stylus movement following said pattern, including:
      (1) a housing member for retaining said stylus and adapted to permit stylus movement with respect thereto;
      (2) means for biasing said stylus outwardly of said housing member towards said pattern;
   the improvement comprising:
   (d) a spherically curved bearing race;
   (e) said rotatable member including a spherically curved surface portion rotatably retained within said race;
   (f) means for selectably releasing said connecting member from said rotatable member;
   (g) said scribe extending to a position, intermediate a center of rotation of said rotatable member and said stylus, to contact said workpiece.

2. Apparatus of claim 1 wherein said spherically curved bearing race is a frusto-spherical bearing race.

3. Apparatus of claim 2 wherein said rotatable member includes a frusto-spherical surface retained within said frusto-spherical bearing race.

4. Apparatus of claim 3 wherein said means for connecting said rotatable member with said stylus is received within said rotatable member.

5. Apparatus of claim 4 wherein said frusto-spherical surface of said rotatable member is bounded by parallel planes and said connecting means is received in a bore in said rotatable member perpendicular to said planes.

6. Apparatus of claim 5 wherein said releasing means includes a member larger than said bore secured to said rotatable member-stylus connecting means and contacting said rotatable member at a position remote from said stylus.

7. Apparatus of claim 6 wherein said scribe is part of said releasing means.

8. Apparatus of claim 7 wherein said stylus-rotatable member connecting means is coaxial with said stylus and said releasing means is coaxial with said bore.

9. Apparatus of claim 8 wherein said scribe is coaxial with said stylus.

10. Apparatus of claim 9 wherein said scribe extends through said center of rotation of said rotatable member.

11. Apparatus for scribe engraving a workpiece with a miniature representation of a two-dimensional pattern in response to movement of a stylus following said pattern, comprising;
   (a) a spherically rotatable member;
   (b) said scribe fixedly extending from said spherically rotatable member for movement unitarily with rotatable member rotation;
   (c) means for connecting said rotatable member with said stylus so that said rotatable member rotates in response to stylus movement following said pattern, including:
      (1) a holding member retaining said stylus for axially sliding stylus movement with respect thereto; and
      (2) means for biasing said stylus axially towards said pattern;
   (d) a frusto-spherical bearing race remote from said pattern and having a passageway therethrough axially skew to said pattern;
   (e) said rotatable member including a frusto-spherical surface rotatably retained within said race;
   (f) a shoulder of said connecting means remote said stylus residing within said passageway, said shoulder including a bore coaxial with said connecting means;
   (g) axially elongated threaded means, including a head portion externally overlying said shoulder oppositely from said rotatable member-stylus connecting means, for retaining said shoulder within said bore, said scribe being formed at an end of said threaded member.

12. Apparatus of claim 11 wherein said axially elongated threaded member extends through said shoulder.

13. Apparatus of claim 12 wherein said scribe is formed at an end of said threaded member proximate said stylus.

14. Apparatus of claim 13 wherein said threaded means includes a shaft threadedly engaging said bore in said shoulder and a head portion secured about said shaft and overlying said shoulder oppositely from said rotatable member-stylus connecting means and further including means for retaining said head portion in secure engagement with said threaded shaft.

15. Apparatus for scribe engraving a workpiece with a miniature representation of a pattern in response to movement of a stylus following said pattern, including:
   (a) a spherically rotatable member;
   (b) means for connecting said scribe with said spherically rotatable member for effecting motion of said scribe with said rotatable member as said rotatable member rotates;
   (c) means for connecting said rotatable member with said stylus for effecting rotatable member rotation in response to stylus movement following said pattern, including:
      (1) a housing member for retaining said stylus and adapted to permit axial stylus movement with respect thereto;

(2) means for biasing said stylus outwardly of said housing member towards said pattern;

(d) frame means including a seat receiving said spherically rotatable member, for supporting said pattern remote from said rotatable member and proximate said stylus;

(e) said pattern being defined by letter blocks retained within a positioning grid, each of said letter blocks having alphanumeric indicia on a surface thereof;

(f) said positioning grid being connected to said frame and including means for releasably engaging said letter blocks with said block surfaces including said alphanumeric indicia facing said stylus;

(g) means for locating said positioning grid at a preselected position on said frame with respect to said rotatable member.

16. Apparatus of claim 15 wherein said grid includes receptacle means for receiving said letter blocks and for releasably retaining said letter blocks with letter block surfaces having alphanumeric indicia thereon facing said stylus.

17. Apparatus of claim 16 wherein said receptacles are individual receptacles adapted for individually receiving individual ones of said letter blocks.

18. Apparatus of claim 15 wherein said positioning grid includes channel means for receiving a plurality of said individual letter blocks and retaining said letter blocks with surfaces thereof having alphanumeric indicia thereon facing said stylus.

19. Apparatus of claim 18 wherein said positioning grid is deformable resilient material.

20. Apparatus of claim 17 wherein said positioning grid is deformable resilient material.

21. Apparatus for scribe engraving a workpiece with a miniature representation of a pattern followed by a stylus, comprising:

(a) a spherically rotatable member;

(b) said scribe fixedly extending from said spherically rotatable member for scribe movement unitarily with said rotatable member upon rotation thereof;

(c) means connecting said rotatable member with said stylus for rotatable member rotation in response to stylus movement following said pattern, including:

(1) a holding member retaining said stylus for axially sliding stylus movement with respect thereto; and (2) means for biasing said stylus axially towards said pattern;

(d) a frusto-spherical bearing race remote from said pattern and having a passageway therethrough axially skew to said pattern;

(e) said rotatable member including a frusto-spherical surface rotatably retained within said race;

(f) a shoulder of said connecting means remote said stylus residing within said passageway, said shoulder including a bore coaxial with said connecting means;

(g) axially elongated threaded means, including a head externally overlying said shoulder oppositely from said rotatable member-stylus connecting means, for retaining said shoulder within said bore, said scribe being formed at an end of said threaded member;

(h) frame means receiving said bearing race, for supporting said pattern remote from said rotatable member and proximate said stylus;

(i) said pattern being defined by letter blocks individually retained within a positioning grid, each of said letter blocks having alphanumeric indicia in a surface thereof;

(j) said positioning grid being connected to said frame and including resilient receptacle means for releasably engaging said letter blocks with said alphanumeric indicia facing said stylus.

22. Apparatus for scribe engraving a workpiece with a miniature representation of a two-dimensional pattern in response to movement of a stylus following said pattern, comprising:

(a) a frusto-spherically rotatable member;

(b) said scribe extending from said rotatable member for movement therewith upon rotatable member rotation;

(c) telescoping means for connecting said rotatable member with said stylus, including;

(1) a holding member retaining said stylus, said stylus extending axially therefrom;

(2) means for biasing said stylus outwardly of said holding member when said holding member is within a preselected range of distances of said rotatable member with force increasing as said telescoping means extends through said range with said stylus contacting said pattern and with force which is independent of movement of said telescoping means outside of said preselected range;

(d) a frusto-spherical bearing race remote from said pattern and having a passageway therethrough axially skew to said pattern;

(e) said rotatable member including a frusto-spherical surface rotatably retained within said race;

(f) means for selectably releasing said telescoping means from said rotatable member;

(g) said scribe extending to intermediate a center of rotation of said rotatable member and said stylus;

(h) frame means receiving said race, for supporting said pattern remote from said rotatable member and proximate said stylus;

(i) said pattern being defined by letter blocks retained within a positioning grid, said letter blocks having alphanumeric indicia on a stylus-facing surface thereof;

(j) said positioning grid being connected to said frame and including means for releasably engaging said letter blocks;

(k) means for locating said positioning grid at a preselected position on said frame with respect to said rotatable member;

(1) means for contacting said workpiece with said scribe, responsive to said stylus contacting said pattern and said holding member being within said preselected range of distances from said rotatable member, said contacting means including gripping means, movable along said contacting means, for holding said workpiece, vernier means for closing said gripping means against said workpiece and means for adjustably retaining said gripping means at a selected position on said contacting means.

23. Apparatus for scribe engraving a workpiece with a two-dimensional pattern in response to movement of a stylus following said pattern, comprising:

(a) a frusto-spherically rotatable member;

(b) said scribe extending from said rotatable member for movement therewith upon rotatable member rotation;

(c) telescoping means for connecting said rotatable member with said stylus, including;

(1) a holding member retaining said stylus, said stylus extending axially therefrom;

(2) means for biasing said stylus outwardly of said holding member when said holding member is within a preselected range of distances of said rotatable member with force increasing as said telescoping means extends through said range with said stylus contacting said pattern, and with force which is independent of movement of said telescoping means outside of said preselected range;

(d) a frusto-spherical bearing race remote from said pattern;

(e) said rotatable member including a frusto-spherical surface rotatably retained within said race;

(f) means for selectably releasing said connecting means from said rotatable member;

(g) means for contacting said workpiece with said scribe responsive to said stylus contacting said pattern and said holding member being within said preselected range of distances.

24. Apparatus for scribe engraving a workpiece with a two-dimensional pattern in response to movement of a stylus following said pattern, comprising:

(a) frustro-spherically rotatable means for providing relative frustro-spherical motion between said scribe and said workpiece;

(b) telescoping means for connecting said frustro-spherically rotatable means with said stylus and for selectably engaging said scribe with said workpiece for scribe engraving of said workpiece in response to movement of said stylus over said pattern, including:

(1) a holding member retaining said stylus, said stylus extending axially therefrom;

(2) means for biasing said stylus outwardly of said holding member when said holding member is within a preselected range of distance of said rotatable means with force increasing as said telescoping means extends through said range with said stylus contacting said pattern and with force which is independent of movement of said telescoping means outside of said range; and (c) means for selectably releasing said telescoping connecting means from said frustro-spherically rotatable means.

25. Apparatus for scribe engraving a workpiece with a miniature representation of a pattern responsively to movement of a stylus following said pattern, comprising:

(a) means for affecting relative spherical motion between said scribe and said workpiece responsively to movement of said stylus over said pattern;

(b) means for affecting scribe-workpiece contact responsively to convergence of said stylus and said pattern to within a distance range within which said stylus contacts said pattern, including:

(i) telescopingly engaging members, said stylus being biased outwardly of said telescoping members with increasing force as said telescoping members extend through a selected range of positions towards said pattern while said stylus is within said distance range of said pattern; and (ii) means for biasing said stylus outwardly of said telescoping members with force independent of movement of said members outside of said selected range of positions.

26. Apparatus of claim 25 wherein said contact affecting means further comprises:

(a) means for gripping said workpiece for scribe contact therewith, at least a portion of said gripping means being moveable along and with respect to the remaining portion of said contact affecting means; and (b) means for retaining said moveable portion of said gripping means at a selected position on said remaining portion of said contact affecting means with respect which said moveable portion of said gripping means moves.

27. Apparatus of claim 25 wherein said contact affecting means includes means for affecting scribe-workpiece contact in opposition to bias applied to said stylus by said stylus biasing means when said telescoping members are within said selected range of positions.

28. Apparatus of claim 25 wherein said contact affecting means further comprises:

(a) gripping means for selectably retaining the workpiece immovably with respect to the scribe, for engraving contact of the workpiece by the scribe upon movement of the gripping means-retained workpiece to a position at which the scribe may contact the workpiece upon activation of said contact affecting means, including:

i. workpiece holding jaws, at least one of the jaws being moveable, for retaining the workpiece therebetween as the movable jaw is urged towards the remaining jaw;

ii. a portion of said contact affecting means defining a support for said remaining jaw, along which said movable jaw moves;

iii. vernier means for moving the movable jaw with respect to the remaining jaw; and iv. adjustable means for selectably maintaining the gripping means at a selected position with respect to the scribe for contacting the workpiece with the scribe upon activation of said contact affecting means;

(b) said contact affecting means biasing the workpiece retained by the gripping means against the scribe in response to operator applied movement of at least one of said telescoping members in opposition to said stylus biasing means.

29. A method for scribe engraving a workpiece with a miniature representation of a pattern in response to movement of a stylus following said pattern, comprising:

(a) biasing said stylus outwardly of a stylus holder;

(b) moving said stylus holder and said outwardly biased stylus towards said pattern to contact said pattern with said stylus;

(c) urging said stylus holder towards said pattern in opposition to said stylus bias and thereby affecting scribe-workpiece contact responsively to movement of said stylus holder to within a preselected distance of said pattern; and (d) following said pattern with said stylus to affect relative spherical motion between said scribe and said workpiece while continuously urging said stylus holder towards said pattern and maintaining said stylus holder within said preselected distance in opposition to stylus bias, thereby continuously maintaining scribe-workpiece contact for workpiece engraving by said scribe as said stylus follows said pattern.

* * * * *